Sept. 17, 1968  R. A. MITCHELL ET AL  3,401,961
FRAME ASSEMBLY AND CLIP THEREFOR
Filed March 25, 1966  2 Sheets-Sheet 1
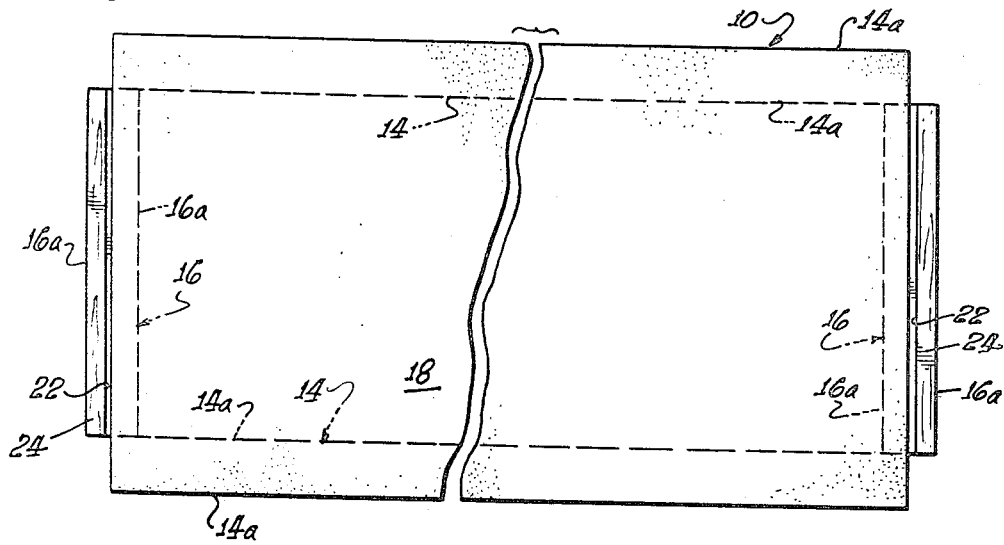
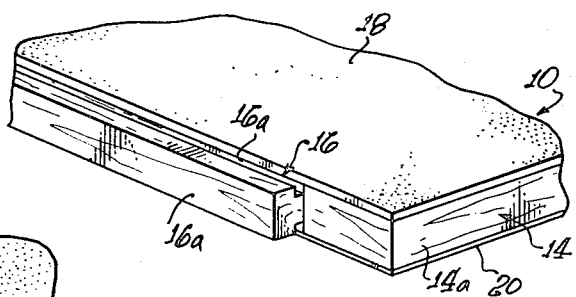
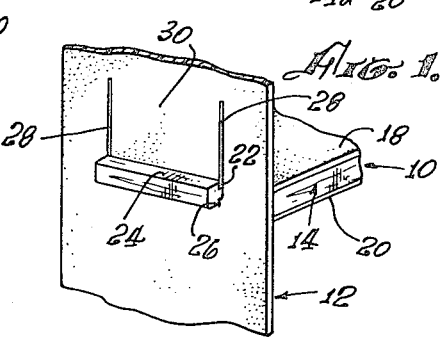
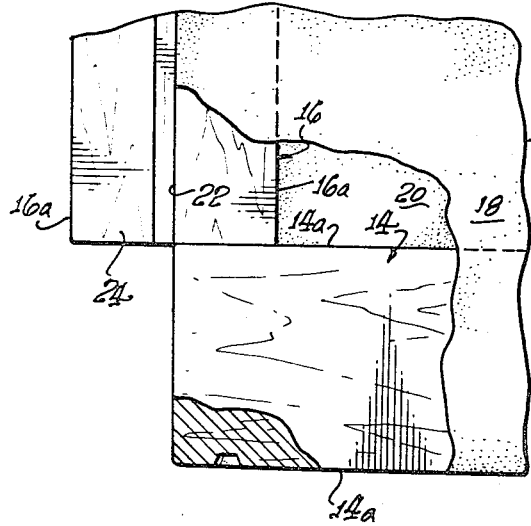
INVENTORS.
RICHARD A. MITCHELL,
LEONARD B. DOUGHERTY,
By Bernard J. Brown
ATTORNEY

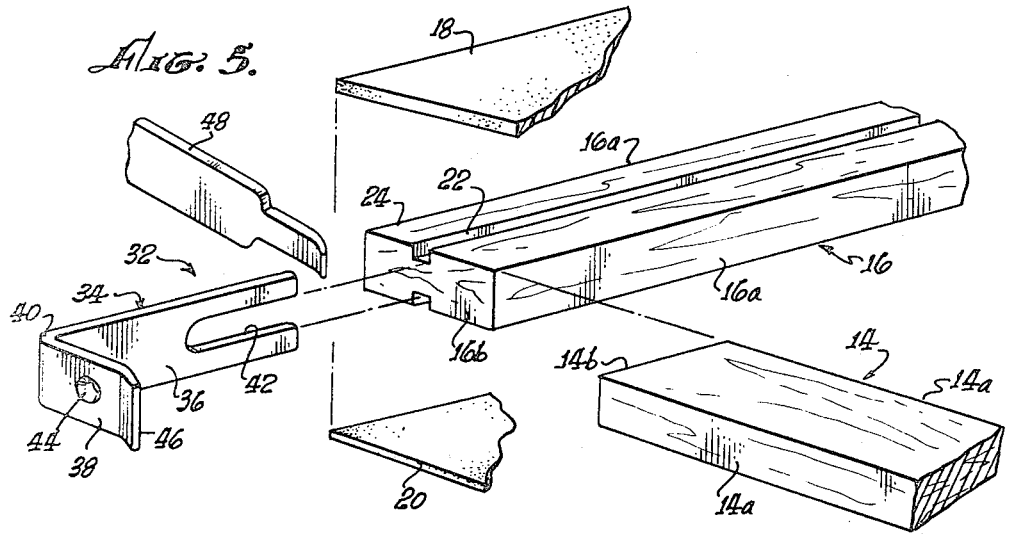
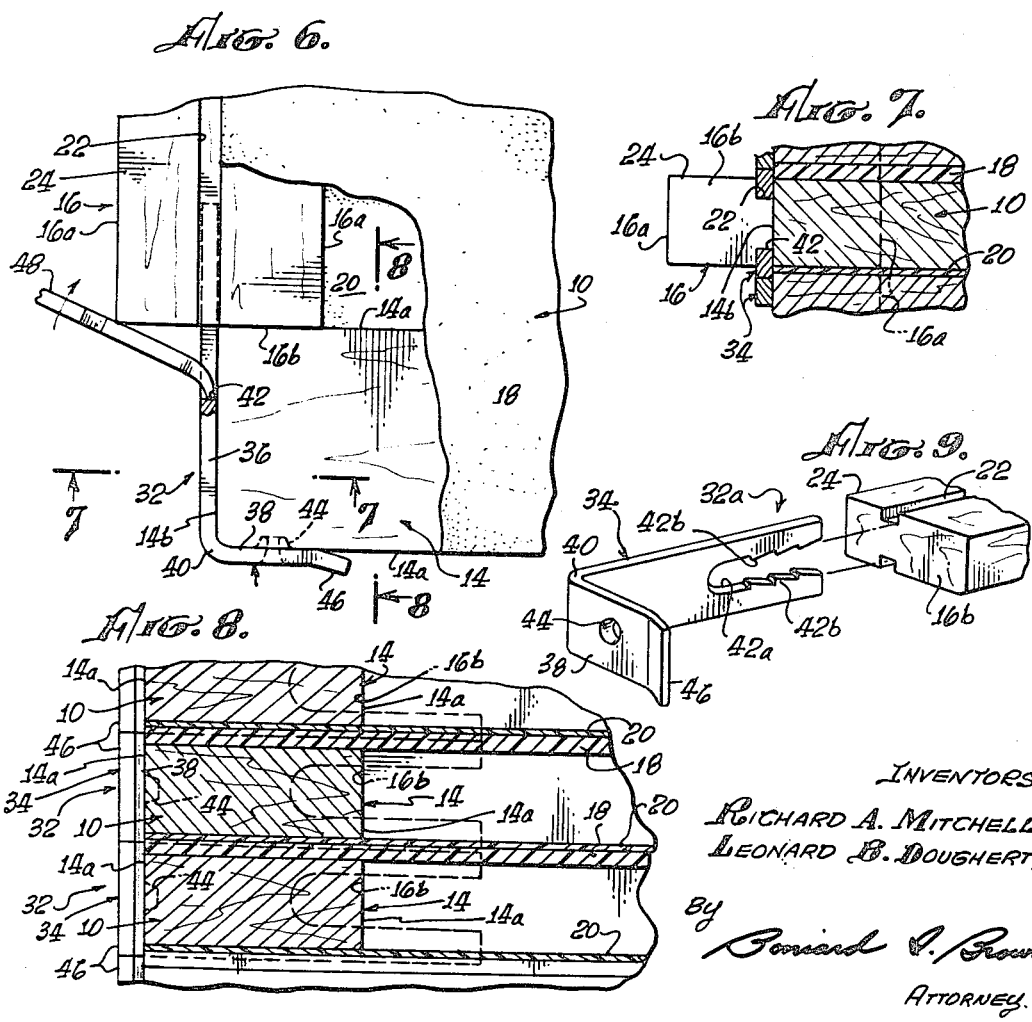

United States Patent Office 3,401,961
Patented Sept. 17, 1968

3,401,961
FRAME ASSEMBLY AND CLIP THEREFOR
Richard A. Mitchell, 963 E. Dalton, Glendora, Calif. 91740, and Leonard B. Dougherty, 13554 E. Corak St., Baldwin Park, Calif. 91706
Filed Mar. 25, 1966, Ser. No. 537,341
12 Claims. (Cl. 287—20.92)

ABSTRACT OF THE DISCLOSURE

The combination of a pair of corner forming members disposed with a longitudinal edge surface of one member abutting an end surface of the other member, and a removable L-shaped corner clip having a first leg seating against the opposite longitudinal edge surface of the one member and a slotted transverse leg straddling the other member in a longitudinal plane of and releaseably secured to the latter member for joining the members in corner forming relation while the members are being adhesively bonded or otherwise permanently joined.

---

The present invention relates generally to the art of fabricating composite wooden structures, such as wooden panels and the like; more particularly, the invention relates to a novel corner clip for aiding the fabrication of such structures.

As will appear from the ensuing description, the corner clip of the present invention may be utilized to aid the fabrication of various types of composite wooden structures. The primary application of the clip, however, involves the fabrication of hollow wood panels of the kind disclosed in our copending application Ser. No. 502,903, filed Oct. 23, 1965, and entitled, "Cabinet Structure and Method of Assembly", now Patent No. 3,326,149. For this reason, the invention will be disclosed in connection with this particular application thereof.

Briefly, our copending application, just referred to, discloses a cabinet structure composed of a pair of upright side panels, or stiles, as they are commonly referred to, and a number of horizontal shelves extending between and terminally supported on the stiles. Each shelf comprises a hollow rectangular panel composed of side and end frame members, which are bonded to one another at the corners of the panel and upper and lower facing sheets which are bonded to the upper and lower surfaces, respectively, of the frame members. The two end frame members have longitudinally grooved, tenon-like formations which project edgewise beyond the adjacent end edges of the facing sheets for engaging in horizontal slots in the stiles. Extending from the ends of these slits are vertical cuts, or slits, which define on the stiles flap-like portions that are resiliently yieldable to permit insertion of the shelf panel tenon formations into the slots to final positions of assembly wherein the edges of the slots engage in the tenon grooves to interlock the stiles and shelves in assembled relation.

It is a general object of this invention to provide a corner clip for aiding fabrication of shelf panels of the kind described above and other composite wood structures composed of corner forming frame members with or without facing sheets.

A more specific object of the invention is to provide a corner clip of the character described which is effective to retain two corner forming members in assembled relation while they are being joined to one another.

Another object of the invention is to provide a corner clip of the character described for aiding the fabrication of hollow rectangular panels composed of corner forming frame members with overlying facing sheets, which clip is uniquely constructed to retain the adjacent frame members in assembled, corner forming relation and the facing sheets in accuracte alignment with the frame members while the latter and facing sheets are being joined.

A related object of the invention is to provide a corner clip for aiding fabrication of composite panels of the character described, wherein the panel frame members and facing sheets are adhesively joined and a number of the panels are stacked one on top of the other for simultaneous compression thereof during setting of the adhesive, and wherein further the present corner clips serve to interlock the adjacent stacked panels against relative edgewise movement during compression thereof.

A further object of the invention is to provide a corner clip of the character described which is particularly well suited for aiding the fabrication of shelf panels of the kind disclosed in our aforementioned copending application Ser. No. 502,903.

Yet a further object of the invention is to provide a corner clip of the character described which is relatively simple in construction, economical to manufacture, easy to install, capable of reuse, and is otherwise ideally suited to its intended purposes.

Other objects, features and advantages of the present invention will become apparent to those versed in the art from a consideration of the following description, the appended claims and the accompanying drawings, wherein:

FIGURE 1 is a fragmentary perspective view of a portion of the cabinet structure disclosed in our aforementioned copending application Ser. No. 502,903.

FIGURE 2 is an enlarged plan view of a shelf panel of this cabinet structure;

FIGURE 3 is a fragmentary perspective view of one end of the panel of FIGURE 2;

FIGURE 4 is a fragmentary detail, partially broken away, of one corner of the panel;

FIGURE 5 is a fragmentary, exploded perspective view of the panel, a present corner clip, and a tool which is utilized for removing the clip from the panel after fabrication of the latter;

FIGURE 6 is a view similar to FIGURE 4 showing the corner clip installed on the panel and the clip removing tool in position for removing the clip from the panel;

FIGURE 7 is a section taken on line 7—7 in FIGURE 6;

FIGURE 8 is a section showing the manner in which several shelf panels are stacked for simultaneous compression thereof during setting of the glue applied to the panels and illustration, particularly, the interlocking action of the panels and the present corner clips, whereby the adjacent stacked panels are restrained against relative edgewise movement during compression; and FIGURE 9 is a perspective view illustrating a modified corner clip according to the invention for use, primarily, on hard woods.

As noted earlier, the cabinet structure disclosed in our aforementioned application, Ser. No. 502,903 comprises a pair of upright stiles and a number of horizontal shelf panels extending between and terminally supported on these stiles. FIGURE 1 illustrates one shelf panel 10 and one stile 12 of this cabinet structure. As shown best in FIGURES 2 through 5, the shelf panel 10 comprises a pair of spaced parallel side frame members 14, a pair of spaced parallel end frame members 16 located at the ends of and extending normal to the side frame members, an upper facing sheet 18, and the lower facing sheet 20. The side frame members 14 have side edges 14a and end edges 14b. The end frame members 16 have side edges 16a and end edges 16b. The inner side edges 14a of the side frame members 14 are disposed in abutting engagement with and are adhesively bonded to the end edges 16b of the end frame members 16. The facing sheets 18 and 20 are adhesively bonded to the upper and lower surface of the frame members 14, 16. The side edges of the facing sheets are flush with the outer side edges 14a of the side frame members 14. The end edges of the facing sheets are flush with the end edges 14b of the side frame members. The end frame members 16 project laterally beyond the end edges of the side frame members and the facing sheets, as shown. The projecting portions of the end frame members have longitudinal grooves 22 in their upper and lower surfaces, the inner walls of which grooves are flush with the end edges of the side frame members and facing sheets. These projecting portions of the end frame members define longitudinally grooved, tenon-like formations, or lugs, 24 on the ends of the shelf panel 10.

Each stile 12 of the cabinet structure is fabricated from sheet material, such as Masonite, or the like, and is formed with horizontal slots (only one shown) for receiving the grooved tenon formations, or lugs, 24 on the shelf panels 10. Extending from the ends of each slot 26 are vertical cuts or slits 28 which define, adjacent each slot, a resiliently yieldable flap-like portion 30. The width of each stile slot 26 is substantially equal to or just slightly greater than the thickness dimension of each panel tenon formation 24, measured between the bottom walls of the respective tenon grooves 22. When assembling the shelf panels 10 and the stiles 12, the panel tenons 24 are forced edgewise through the stile slots 26 to the final positions of assembly, illustrated in FIGURE 1, wherein the edge portions of these slots engage in the tenon grooves to firmly lock the stiles and shelf panels in assembled relation. During this insertion of the panel tenons through the stile slots, the resiliently yieldable, flap-like portions 30 of the stiles are initially deflected outwardly by the tenons to permit insertion of the latter through the slots, after which these portions snap back into engagement in the tenon grooves.

According to the present invention, the frame members 14 and 16 and facing sheets 18 and 20 are retained in assembled relation during adhesive bonding of these parts to one another to form the completed shelf panel 10 by means of four corner clips 32 (only one shown) located at the four corners of the panel. Each corner clip 32 comprises a generally L-shaped clip body 34 including a pair of generally flat legs 36 and 38 integrally joined at one end and disposed in substantially mutually perpendicular planes which intersect along the juncture 40 of the legs. Extending into the opposite end of the longer clip leg 36 is a longitudinal slot 42 having a width substantially equal to or just slightly greater than the thickness dimension of the shelf panel tenons 24, measured between the bottom walls of the tenon groove. The thickness of the clip leg 36 is substantially equal to or just slightly less than the width of the tenon grooves. The shorter clip leg 38 has a relatively sharp, annular prong-like formation 44 projecting beyond its inner surface, at a position intermediate the ends of this leg. The outer end portion of the clip leg 38 is turned outwardly at an acute angle relative to the plane of the leg to form an inclined lip 46.

When fabricating the shelf panel 10, a suitable adhesive is applied to the contacting surfaces of the frame members 14, 16 and the facing sheets 18, 20. The frame members are then placed in the assembled relation described earlier and illustrated in FIGURES 2 through 4. After the frame members are thus assembled, the corner clips 32 are installed on the frame members in the manner illustrated in FIGURE 6. When thus installing the clips, the longer, slotted clip legs 36 are inserted into the grooves 22 in the projecting, tenon forming portions of the end frame members 16 in such manner that the shorter clip legs 38 extend inwardly in overlapping relation with the adjacent ends of the side frame members 14. The clips are then driven inwardly to their final positions of FIGURE 6, wherein the clip prongs 44 are embedded in the outer edge surfaces of the side frame members 14, thereby to firmly anchor the latter frame members to the clips. The slotted clip legs 36 are dimensioned to have a snug fit in the grooves 22 of the end frame members 16, whereby in their final positions of FIGURE 6, the corner clips 32 firmly retain the adjacent frame members 14, 16 in their assembled, corner forming relation. After assembly of the frame members 14, 16 and corner clips 32 in the manner described above, the facing sheets 18, 20 are placed in assembled relation with the frame members.

According to a preferred feature of the invention, the edgewise width of the corner clip legs 36, 38 is greater than the thickness of the panel frame members 14, 16. Accordingly, when the corner clips are assembled on the frame members, the clip legs project edgewise beyond the upper and lower surfaces of the frame members, as illustrated in FIGURE 7, whereby the corner clips serve to accurately locate the facing sheets 18, 20 relative to the frame members when the sheets are placed in adhesive bonding relation to the frame members. When installing the facing sheets on the frame members, therefore, it is necessary only to drop the sheets into position between the projecting corner clips which then automatically align the sheets with the frame members.

After the frame members 14, 16, facing sheets 18, 20, and corner clips 32 have been assembled, as described above, the now partially completed shelf panel 10 is preferably placed under compression during setting of the adhesive applied to the panel, thereby to create adhesive bonds of maximum strength between the frame members and facing sheets. This is accomplished by stacking several panels one on top of the other, in the manner illustrated in FIGURE 8, and placing the panel stack between a pair of pressure plates, or the like (not shown) and urging the plates toward one another. In order to assure uniform application of pressure to each panel about its entire circumference, it is necessary that the several stacked panels be accurately aligned in such a way that their side and end edges are flush with one another. According to a further preferred feature of the invention, the present corner clips 32 on the panels are utilized to accurately locate the adjacent panels in alignment with one another. To this end, the corner clips are so constructed that the clip legs 36, 38 project edgewise beyond one facing sheet 18 or 20, only, as illustrated in FIGURE 8. Accordingly, when a number of the shelf panels 10 are stacked one on top of the other, the corner clips on each panel overlap the edges of an adjacent panel, in the manner shown in FIGURE 8, thereby to accurately locate the adjacent panels relative to one another and interlock the adjacent panels against relative edgewise movement. This locating or interlocking action of the corner clips 32 is accomplished in the illustrated shelf panel 10 by virtue of the fact that the upper facing sheet 18 of the panel is typically constructed of substantially thicker sheet stock than the lower facing sheet 20. The present corner clip 32 is so dimensioned, in the edgewise direction, that the upper edges of the clips on each shelf panel 10 are spaced a distance below the upper surface of the upper facing sheet 18 on the panel and the lower edges of the clips project below the lower surface of the lower facing sheet 20 on the panel. It is evident, of course, that the present corner clip may be employed on panels having upper and lower facing sheets of substantially equal thickness. In this case, the above-discussed locating or interlocking action of the corner clip may be achieved by forming the clip slot 42 in such a way that its longitudinal axis is laterally offset from the longitudinal axis of the clip leg 36 a distance such that when the clip is installed on the panel, the upper and lower clip edges will be disposed in the same relative positions relative to the surfaces of the upper and lower panel facing sheets as the upper and lower edges of the corner clip illustrated in the drawings.

After the adhesive applied to the shelf panel 10 has set, the corner clips 32 may be removed from the panel for subsequent reuse. This removal of the corner clips may be accomplished in various ways. For example, the slot 42 in the illustrated corner clip 32 is so longitudinally dimensioned that when the clip is installed on a panel 10, the inner or closed end of the slot is exposed beyond the end edge 16b of its adjacent end frame member 16. This permits removal of the clip by engagement of a simple lever type applying tool 48 with the end wall of the clip slot 42 and the end edge of the adjacent end frame member 16, in the manner illustrated in FIGURE 6, and rotation of the tool about the latter edge as a fulcrum to pry the clip from the panel.

It is evident at this point that while the present corner clip 32 has been disclosed in connection with its use on a shelf panel of the kind disclosed in our aforementioned copending application Serial No. 502,903 the clip may be employed to advantage in other types of composite wooden structures for retaining the component members of these structures in assembled relation while they are being joined. For example, the clip may be used, simply, to retain corner forming frame members in assembled, corner forming relation while these members are being joined by adhesive or other fastening means.

As noted earlier, the grooves 22 in the end frame member 16 are dimensioned to frictionally receive the slotted legs 36 of the corner clips 32. This, in turn, requires a groove width slightly less than the thickness of the slotted clip legs and construction of the end frame members from a relatively soft wood, such as pine, which will yield sufficiently to enable the corner clips to be forced into the grooves. In the event that the end frame members 16 are constructed from a relatively hard wood, it may be necessary to use the modified corner clip configuration of FIGURE 9. The modified corner clip 32a of the latter figure is identical to the corner clip 32 except that the longitudinal edges of the clip slots 42a are serrated, as shown. As may be readily observed in this latter figure, the clip slot edge serrations 42b are shaped in such a way that these serrations permit insertion of the clip into the grooves 22 and the adjacent end frame member 16. The serrations, however, bite into the bottom walls of the grooves in such a way as to resist separation of the clip from the end frame member. After completion of the panel, the modified corner clip 32a is pried from the end frame member in the same way as described earlier in connection with the corner clips 32. While this removal of the modified corner clip may cause the edge serrations 42b to gouge the bottom walls of the grooves 22, such gouging does not interfere with subsequent assembly of the panels and stiles, in the manner described earlier.

Accordingly, the invention herein described and illustrated is fully capable of attaining the several objects and advantages preliminarily set forth.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventors claim:
1. In combination:
a pair of generally flat and coplanar corner forming frame members each having end and side edges,
one of said members being disposed with one of its side edges in abutting engagement with one end edge of the other member and with one of its end edges disposed in a plane passing between the side edges of said other member, and
a generally L-shaped corner clip joining said members in corner forming relation including a first leg extending lengthwise of and disposed in seating contact with the other side edge of said one member and a second longitudinally slotted leg extending across said one end edge of said one member lengthwise of said other member and disposed in straddling engagement with said other member.
2. The combination according to claim 1 wherein:
said first clip leg has a prong-like formation embedded in said other side edge of said one frame member.
3. The combination according to claim 1 wherein:
said other frame member is longitudinally grooved to receive said second clip leg.
4. The combination according to claim 1 wherein:
said other frame member has longitudinal grooves frictionally receiving said second clip leg.
5. The combination according to claim 1 wherein:
said other frame member has longitudinal grooves receiving said second clip leg, and
at least one longitudinal edge of the slot in said second clip leg has serrations which bite into the bottom wall of the respective groove to resist separation of said corner clip from said other member.
6. In combinaton:
a rectangular panel comprising a pair of spaced and generally parallel side frame members, a pair of spaced and generally parallel end frame members extending between the adjacent ends, respectively, of said side frame members, said frame members having coplanar side surfaces at one side thereof, and a facing sheet disposed in seating contact with said side surfaces of said frame members and having side and end edges substantially flush with the outer edges of said side and end frame members, respectively, and
generally L-shaped corner clips extending about at least certain corners of said panel and secured to the adjacent frame members, respectively, for joining said adjacent members in corner forming relation, each clip projecting edgewise beyond said side surface of said frame members for locating said facing sheet relative to said frame members.
7. The combination according to claim 6 wherein:
each said end frame member includes a tenon projecting edgewise beyond the adjacent end edge of said facing sheet, and
each said corner clip comprises a longitudinally slotted leg disposed in straddling engagement with the adjacent tenon.
8. The combination according to claim 6 wherein:
each said end frame member includes a longitudinally grooved tenon projecting edgewise beyond the adjacent end edge of said facing sheet, and
each said corner clip comprises a longitudinally slotted leg disposed in straddling engagement with and engaging in the grooves in the adjacent tenon.
9. The combination according to claim 6 wherein:
said frame members have coplanar side surfaces at the opposite side thereof and said panel comprises a second facing sheet disposed in seating engagement with said latter side surfaces and having side and end edges substantially flush with the outer edges of said side and end frame members, respectively, and
each said corner clip projects edgewise beyond the latter side surfaces of said frame members for locating said second facing sheet relative to said frame members.
10. The combination according to claim 6 wherein:
each said corner clip projects edgewise beyond said first mentioned coplanar side surfaces of said frame members a distance less than the thickness of said first mentioned facing sheet and each corner clip projects edgewise beyond said second mentioned coplanar side surfaces of said frame members a distance greater than the thickness of said second facing sheet, whereby when a number of said panels are stacked one on top of the other, said corner clips are effective to locate the adjacent panels relative to one another and to interlock the adjacent panels against relative edgewise movement.

11. In combination:
a panel comprising a pair of spaced and generally parallel side frame members, a pair of spaced and generally parallel end frame members extending between adjacent ends, respectively, of said side frame members, said frame members having substantially coplanar side surfaces, side edges, and end edges, said side frame members being disposed with their inner side edges in abutting engagement with the end edges, respectively, of said end frame members and with their end edges disposed in a plane passing between the side edges of said end frame members, respectively, first and second facing sheets disposed in seating engagement with said coplanar side surfaces, respectively, of said frame members and having side and end edges substantially flush with the outer side edges of said side and end frame members, respectively, said end frame members projecting edgewise beyond the adjacent end edges, respectively, of said facing sheets to form tenons, and said tenons having longitudinal grooves in opposite sides thereof, and generally L-shaped corner clips extending about at least certain corners of said panel, each said corner clip comprising a first leg disposed in seating contact with the outer side edge of the adjacent side frame member and a longitudinally slotted leg disposed in straddling engagement with and engaging in the grooves in the adjacent tenon, thereby to join the adjacent side and end frame members in corner forming relation, each said corner clip projecting edgewise beyond the coplanar side surfaces at one side of said frame members a distance less than the thickness of the adjacent facing sheet, and each said corner clip projecting edgewise beyond the opposite coplanar side surfaces of said frame members a distance greater than the thickness of the adjacent facing sheet.

12. A corner clip for joining two corner forming members in abutting corner forming relation comprising:
a generally L-shaped metal strip forming a pair of relatively flat clip legs integrally joined at one end and disposed in substantially mutually perpendicular planes which intersect along the juncture of said legs, one of said legs having a slot entering its opposite end in a plane parallel to and laterally displaced from the longitudinal center lines of said legs, the other leg having an inner surface facing said one leg and a relatively sharp prong projecting beyond said inner surface, and the opposite end portion of said other leg turning outwardly at an acute angle relative to the plane of the latter leg to form an outwardly inclined lip.

References Cited

UNITED STATES PATENTS

| | | | |
|---|---|---|---|
| 202,996 | 4/1878 | Cole | 287—20.92 |
| 1,335,944 | 4/1920 | Farnsworth | 85—8.8 |
| 2,316,424 | 4/1943 | Hasenburger et al. | 287—20.92 |
| 3,061,340 | 10/1962 | Fernberg et al. | 287—189.35 |
| 3,115,805 | 12/1963 | Engelmann | 85—8.8 |

FOREIGN PATENTS 820,824  11/1951  Germany.

EDWARD C. ALLEN, *Primary Examiner*

R. S. BRITTS, *Assistant Examiner.*